(12) United States Patent
Naito

(10) Patent No.: US 11,695,884 B2
(45) Date of Patent: Jul. 4, 2023

(54) IMAGE PROCESSING APPARATUS, INFORMATION PROCESSING METHOD, AND NON-TRANSITORY COMPUTER READABLE STORAGE MEDIUM

(71) Applicant: CANON KABUSHIKI KAISHA, Tokyo (JP)

(72) Inventor: Yosui Naito, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 17/227,829

(22) Filed: Apr. 12, 2021

(65) Prior Publication Data

US 2021/0234972 A1 Jul. 29, 2021

Related U.S. Application Data

(63) Continuation of application No. 15/926,843, filed on Mar. 20, 2018, now Pat. No. 11,012,579.

(30) Foreign Application Priority Data

Mar. 24, 2017 (JP) ................................ 2017-059483

(51) Int. Cl.
*H04N 1/08* (2006.01)
*H04N 1/00* (2006.01)
*G06F 3/12* (2006.01)

(52) U.S. Cl.
CPC ....... *H04N 1/00225* (2013.01); *G06F 3/1206* (2013.01); *H04N 1/00307* (2013.01);

(Continued)

(58) Field of Classification Search
CPC .......................... H04N 1/00225; G06F 3/1206
See application file for complete search history.

(56) References Cited

U.S. PATENT DOCUMENTS

2008/0019593 A1‡ 1/2008 Kashiwagi ......... H04N 1/00225
382/190
2013/0130728 A1* 5/2013 Bendrum ................ H04W 4/14
455/466

(Continued)

FOREIGN PATENT DOCUMENTS

JP 2010-41665 A ‡ 2/2010
JP 2010-164663 A 7/2010

(Continued)

*Primary Examiner* — Ibrahim Siddo
(74) *Attorney, Agent, or Firm* — Canon U.S.A., Inc. IP Division

(57) ABSTRACT

An image processing apparatus receives destination information for use in data transmission, performs control, based on the received destination information including a destination in an email address format, so that a first screen, which is used to transmit data external to the image processing apparatus, and on which a transmission destination of the data is displayed, based on the received destination information, is displayed on the operation unit, and performs control, based on the received destination information including only a destination in a fax format so that a second screen, different from the first screen and used to perform fax transmission, on which a transmission destination of the fax transmission is displayed, based on the received destination information, is displayed on the operation unit.

13 Claims, 16 Drawing Sheets

(52) U.S. Cl.
CPC ..... *H04N 1/00408* (2013.01); *H04N 1/00474* (2013.01); *H04N 1/00477* (2013.01); *H04N 1/00482* (2013.01); *H04N 2201/0046* (2013.01); *H04N 2201/0094* (2013.01)

(56) References Cited

U.S. PATENT DOCUMENTS

| | | | | |
|---|---|---|---|---|
| 2013/0148161 A1* | 6/2013 | Park | ...................... | G06K 15/00 358/1.15 |
| 2013/0201529 A1* | 8/2013 | Morita | ............... | H04N 1/00352 358/402 |
| 2014/0293331 A1* | 10/2014 | Asai | ...................... | G06F 3/1204 358/1.15 |
| 2014/0327787 A1* | 11/2014 | Tsujimoto | .......... | H04N 1/00328 348/207.2 |
| 2014/0378064 A1‡ | 12/2014 | Tsaur | ...................... | H04W 4/80 455/41.3 |
| 2018/0101334 A1‡ | 4/2018 | Suzuki | ............... | H04N 1/00244 |

FOREIGN PATENT DOCUMENTS

| | | | | |
|---|---|---|---|---|
| JP | 2011-199504 A | ‡ | 10/2011 | ......... H04N 1/00424 |
| JP | 2013-162481 A | ‡ | 8/2013 | ......... H04N 1/00408 |
| JP | 2015-35767 A | | 2/2015 | |
| JP | 2015-90601 A | | 5/2015 | |
| JP | 2016-21614 A | ‡ | 2/2016 | |
| JP | 2016-185667 A | ‡ | 10/2016 | |
| JP | 2016-201702 A | | 12/2016 | |

\* cited by examiner
‡ imported from a related application

FIG.15

| | | |
|---|---|---|
| 1501 | UNIVERSAL TRANSMISSION LICENSE | PRESENT |
| 1502 | FAX LICENSE | PRESENT |

| TRANSMISSION FUNCTION DISPLAY SETTINGS | | |
|---|---|---|
| 1503 | DISPLAY UNIVERSAL TRANSMISSION SCREEN | ON |
| 1504 | DISPLAY FAX ON UNIVERSAL TRANSMISSION SCREEN | OFF |
| 1505 | DISPLAY FAX TRANSMISSION SCREEN | ON |

IMAGE PROCESSING APPARATUS, INFORMATION PROCESSING METHOD, AND NON-TRANSITORY COMPUTER READABLE STORAGE MEDIUM

CROSS-REFERENCE TO RELATED APPLICATION

This application is a Continuation of U.S. application Ser. No. 15/926,843, filed Mar. 20, 2018, which claims priority from Japanese Patent Application No. 2017-059483, filed Mar. 24, 2017, which are hereby incorporated by reference herein in their entireties.

BACKGROUND

Field

The present disclosure relates to an image processing apparatus, an information processing method, and a program.

Description of the Related Art

In recent years, a multifunction peripheral (hereinafter, an "MFP") including a transmission function that transmits by fax a document read by a scanner or transmits by email an attached file of the document read by the scanner is widely prevalent. Japanese Patent Application Laid-Open No. 2010-41665 discusses, as a technique for setting the destination of a fax or an email in an MFP, a technique of transferring the destination of an email or a fax registered in an address book of a mobile terminal to the MFP using proximity communication such as Wi-Fi®.

There is also already an MFP where an operation screen for fax transmission and an operation screen for data transmission via a network are separately prepared. When fax transmission is performed, such an MFP displays an operation screen on which only settings regarding the fax transmission can be made. When data is transmitted via a network, the MFP displays an operation screen on which only settings regarding the network transmission can be made. There is also an MFP where an operation screen for fax transmission and an operation screen for network transmission are separately prepared, and all settings regarding the fax transmission and the network transmission can be made on one of the operation screens.

SUMMARY

According to an aspect of the present disclosure, an image processing apparatus includes an operation unit, at least one memory device that stores a set of instructions, and at least one processor that executes the instructions, the instructions, when executed, causing the image processing apparatus to perform operations including receiving destination information for use in data transmission, performing control, based on the received destination information including a destination in an email address format, so that a first screen, which is used to transmit data external to the image processing apparatus and on which a transmission destination of the data is displayed, based on the received destination information, is displayed on the operation unit, and performing control, based on the received destination information including only a destination in a fax format, so that a second screen, different from the first screen, and used to perform fax transmission, on which a transmission destination of the fax transmission is displayed, based on the received destination information, is displayed on the operation unit.

Further features will become apparent from the following description of exemplary embodiments with reference to the attached drawings.

BRIEF DESCRIPTION OF THE DRAWINGS

FIG. 15 is a diagram illustrating an example of display setting information.

DESCRIPTION OF THE EMBODIMENTS

Exemplary embodiments of the present disclosure will be described below with reference to the attached drawings.

In a first exemplary embodiment, a mechanism for, in a case where a multifunction peripheral (MFP) receives the setting of a destination from a mobile terminal and sets the received setting as the destination of data transmission, selecting and displaying an appropriate screen from among screens regarding a plurality of transmission functions, improving user operability will be described.

Figure 1:
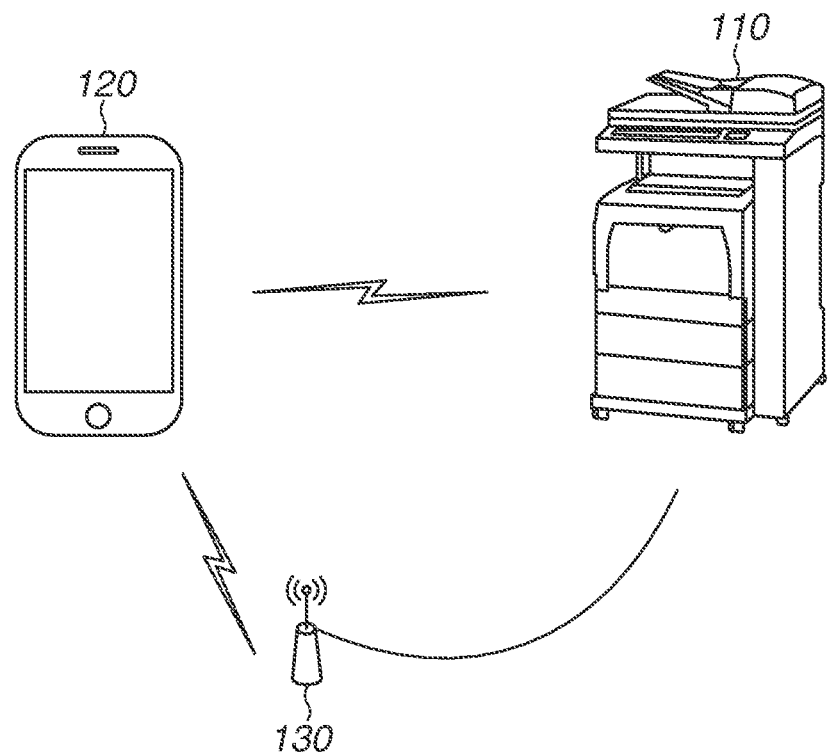
FIG. 1 is an example of a diagram illustrating an entirety of an image forming system.

FIG. 1 is a diagram illustrating the entirety of an image forming system according to the first exemplary embodiment. An MFP 110, a terminal apparatus 120, and an access point 130 can communicate with one another through Wi-Fi® communication with which each of the MFP 110, the terminal apparatus 120, and the access point 130 is compatible. The MFP 110 is an example of an image processing apparatus. The terminal apparatus 120, which is a mobile information processing apparatus, is an example of an apparatus external to the MFP 110. The terminal apparatus 120 is assumed to be an apparatus such as a smartphone or a tablet personal computer (PC), but can be any other information processing apparatus that performs Wi-Fi® communication. The MFP 110 and the terminal apparatus 120 can connect to and communicate with each other in a Wi-Fi® infrastructure mode via the access point 130. Alternatively, as another example, the MFP 110 itself can operate in a software access point mode and directly connect to and communicate with the terminal apparatus 120 through a Wi-Fi Direct® connection without using the access point 130.

Figure 2:
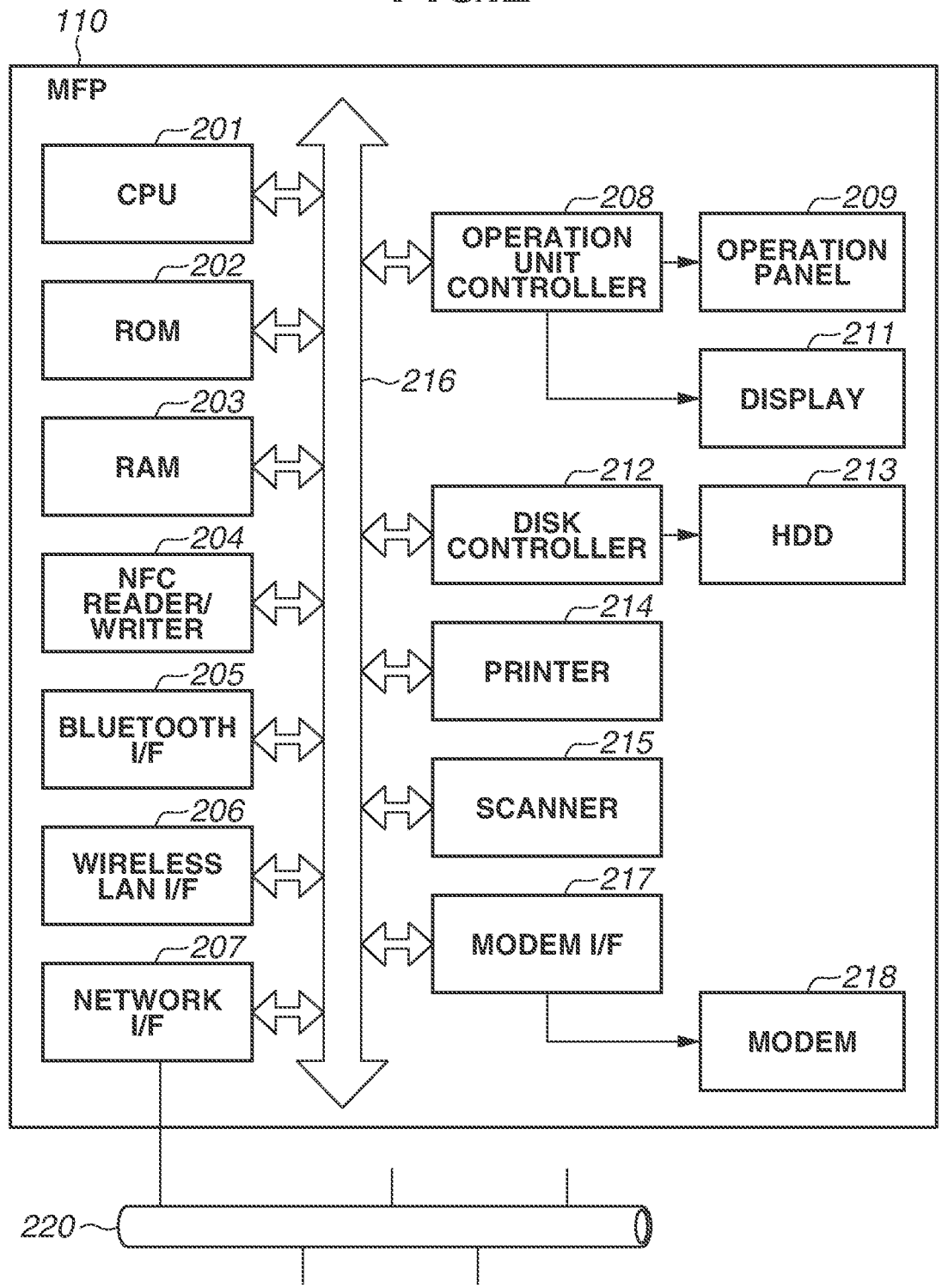
FIG. 2 is an example of a hardware configuration diagram of a multifunction peripheral (MFP).

FIG. 2 is a hardware configuration diagram of the MFP 110. The MFP 110 includes a central processing unit (CPU) 201, which executes software stored in a read-only memory (ROM) 202 or a hard disk drive (HDD) 213. The CPU 201 performs overall control of devices connected to a system bus 216. In some cases, the HDD 213 can also be used as the temporary storage location of an image. A random-access memory (RAM) 203 functions as a main memory or a work area for the CPU 201. An operation unit controller 208 controls various buttons included in the MFP 110, an operation panel 209, and a display 211. A disk controller 212 controls the HDD 213. The functions and the processing of the MFP 110 described below are achieved when the CPU 201 reads a program stored in the ROM 202 or the HDD 213 and executes the program.

In the MFP 110 according to the present exemplary embodiment, a single CPU 201 uses a single memory (the RAM 203) to execute processes illustrated in the below-described flowcharts. Alternatively, another form can be employed. For example, a plurality of processors, RAMs, ROMs, and storages can cooperate to execute the processes illustrated in below-described flowcharts. Some of the processes can be executed using a hardware circuit.

A network interface (I/F) 207 exchanges data with another network device or a file server in a two-way manner via a network 220. In a case where the MFP 110 operates in the infrastructure mode, a wireless local area network (LAN) I/F 206 connects to the network 220 and exchanges data with another network device or a file server in a two-way manner via an access point. In a case where the MFP 110 operates in the software access point mode, the MFP 110 can operate as an access point and directly connect to the terminal apparatus 120 through wireless communication.

A printer 214 is a printing unit implemented by an electrophotographic method for performing printing on paper. The printing method is not limited to the electrophotographic method. A scanner 215 is an image reading unit for reading an image on a document. In many cases, an auto document feeder (ADF) is mounted as an option on the scanner 215, and the scanner 215 can automatically read a plurality of documents. Image data obtained by the scanner 215 reading the image on the document is transferred to the RAM 203 or the HDD 213. The image data is transmitted to an external apparatus via the network 220 or transmitted by fax via a public telephone network.

The MFP 110 can transmit and receive data to and from various peripheral devices via a near-field communication (NFC) reader/writer 204 for a contactless integrated circuit (IC) card and a Bluetooth® I/F 205. Regarding Bluetooth®, in recent years, an apparatus compatible with Bluetooth® Low Energy for performing power saving communication has also become prevalent. A modem I/F 217 controls a modem 218. The modem 218 perform modulation and demodulation between digital data and an analog audio signal based on an International Telecommunication Union (ITU-T) Recommendation, and the digital data and the analog audio signal is used for data transmission for fax communication or procedure control. A fax function is optional, and therefore, the modem 218 may not be included.

Figure 3:
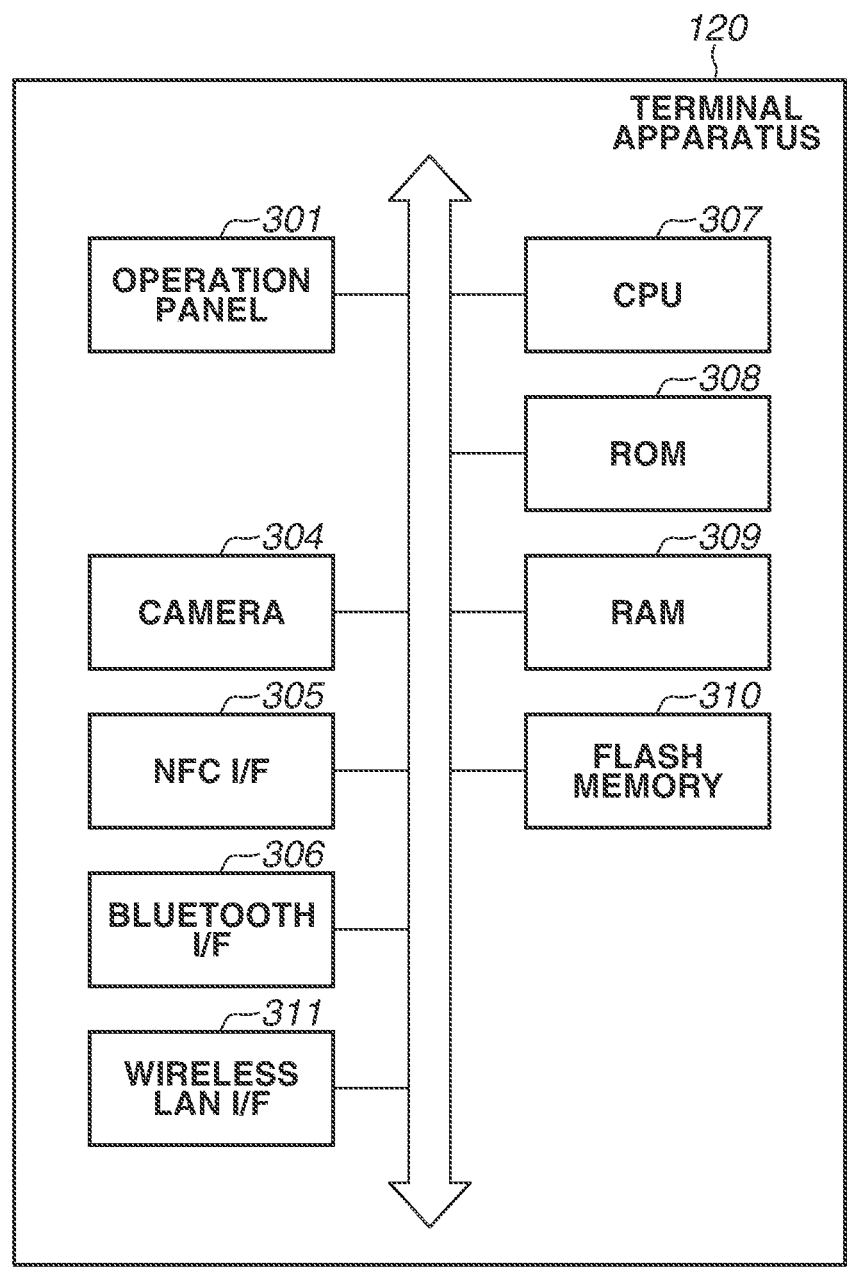
FIG. 3 is an example of a hardware configuration diagram of a terminal apparatus.

FIG. 3 is a hardware configuration diagram of the terminal apparatus 120. A CPU 307 reads a control program stored in a ROM 308 and executes various types of processing for controlling the operation of the terminal apparatus 120. The ROM 308 stores the control program. A RAM 309 is used as a temporary storage area such as a main memory or a work area for the CPU 307. A flash memory 310 stores various types of data such as a photograph and an electronic document. The functions and the processing of the terminal apparatus 120 described below are achieved by the CPU 307 reading a program stored in the ROM 308 and executing the program.

An operation panel 301 includes a touch panel function that detects a user's touch operation and displays various screens provided by an operating system (OS) and an email transmission application. The user can input a touch operation to the operation panel 301, thereby inputting a desired operation instruction to the terminal apparatus 120. The operation panel 301 includes a hardware key, and the user can input an operation instruction to the terminal apparatus 120 using the hardware key.

A camera 304 captures an image based on an image capturing instruction from the user. A photograph captured by the camera 304 is stored in a predetermined area of the flash memory 310. Using a program that can analyze a Quick Response (QR) Code®, the terminal apparatus 120 can also acquire information from a QR Code® read by the camera 304. The terminal apparatus 120 can transmit and receive data to and from various peripheral devices via an NFC I/F 305, a Bluetooth® I/F 306, and a wireless LAN I/F 311. With respect to the terminal apparatus 120, terminals compatible with Bluetooth® Low Energy have started to become prevalent.

Figure 4:
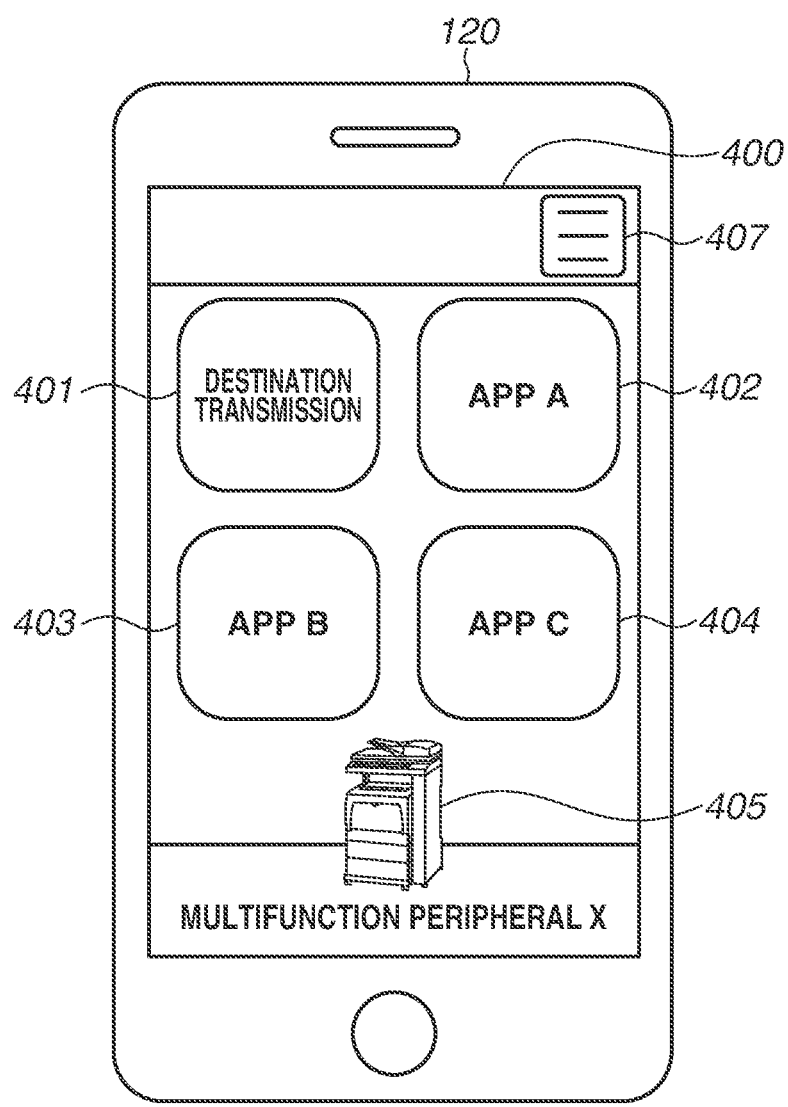
FIG. 4 is a diagram illustrating an example of a menu screen.

Next, with reference to FIGS. 4 to 7, display screens of the terminal apparatus 120 are described. FIG. 4 is a diagram illustrating a menu screen 400. The menu screen 400 is a screen for setting a mobile application and selecting a function. Each of function selection buttons 401, 402, 403, and 404 enable the user to provide an instruction to start using a function provided by a mobile application. The function selection button 401 is a button for selecting a "destination transmission" application for setting destination information (an email destination and a fax destination) and email information to be transmitted to the MFP 110. An MFP list 405 displays a list of MFPs 110 with which mobile applications have communicated in the past. When the terminal apparatus 120 communicates with an MFP 110, the terminal apparatus 120 stores information of the MFP 110 in the ROM 308. The user can select an MFP 110 from the MFP list 405, thereby specifying the selected MFP 110 as a communication destination. If a setting button 407 is pressed, the terminal apparatus 120 displays a setting screen.

Figure 5:
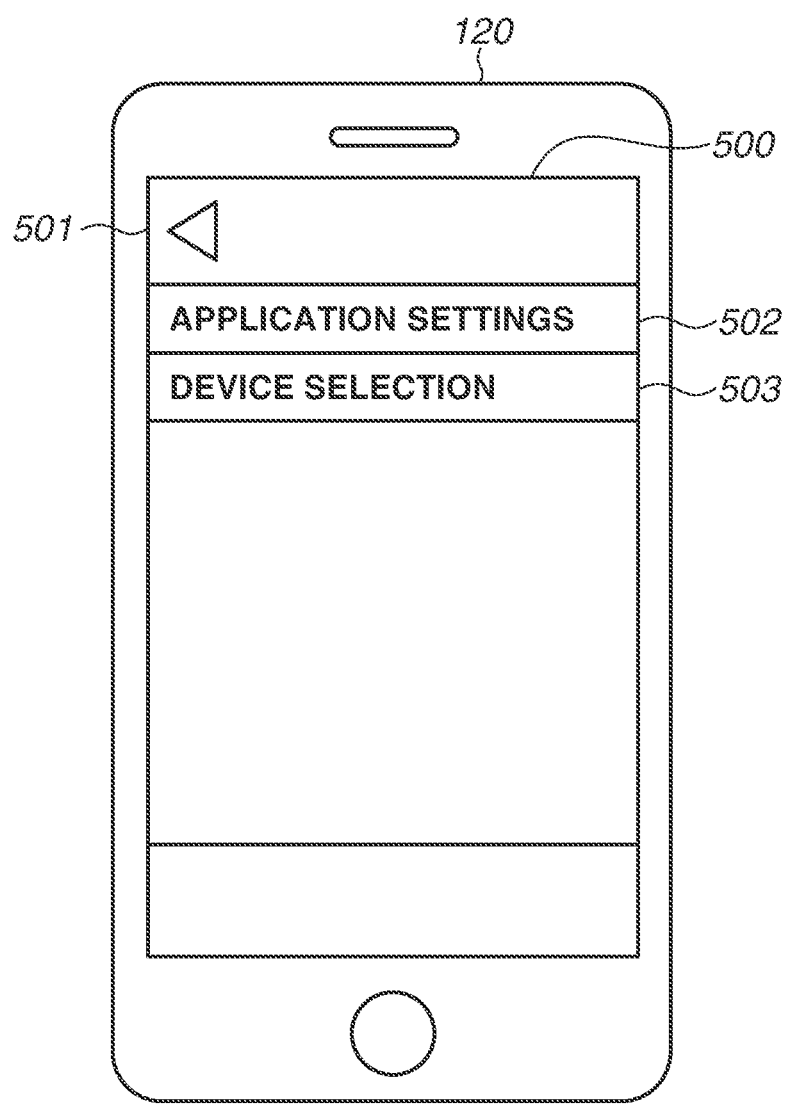
FIG. 5 is a diagram illustrating an example of a setting screen.

FIG. 5 is a diagram illustrating a setting screen 500. If a return button 501 is pressed, the terminal apparatus 120 stores the settings of the mobile applications and transitions to the menu screen 400 illustrated in FIG. 4. If an "application settings" button 502 is pressed, the terminal apparatus 120 displays a list of setting items of the mobile applications. The setting items of the mobile applications include, for example, the registration of the setting of user authentication information of an MFP 110 and the setting of a method of connecting to an MFP 110 when a destination is transmitted, but are not limited to these. If a "device selection" button 503 is pressed, the terminal apparatus 120 displays a device selection screen.

Figure 6:
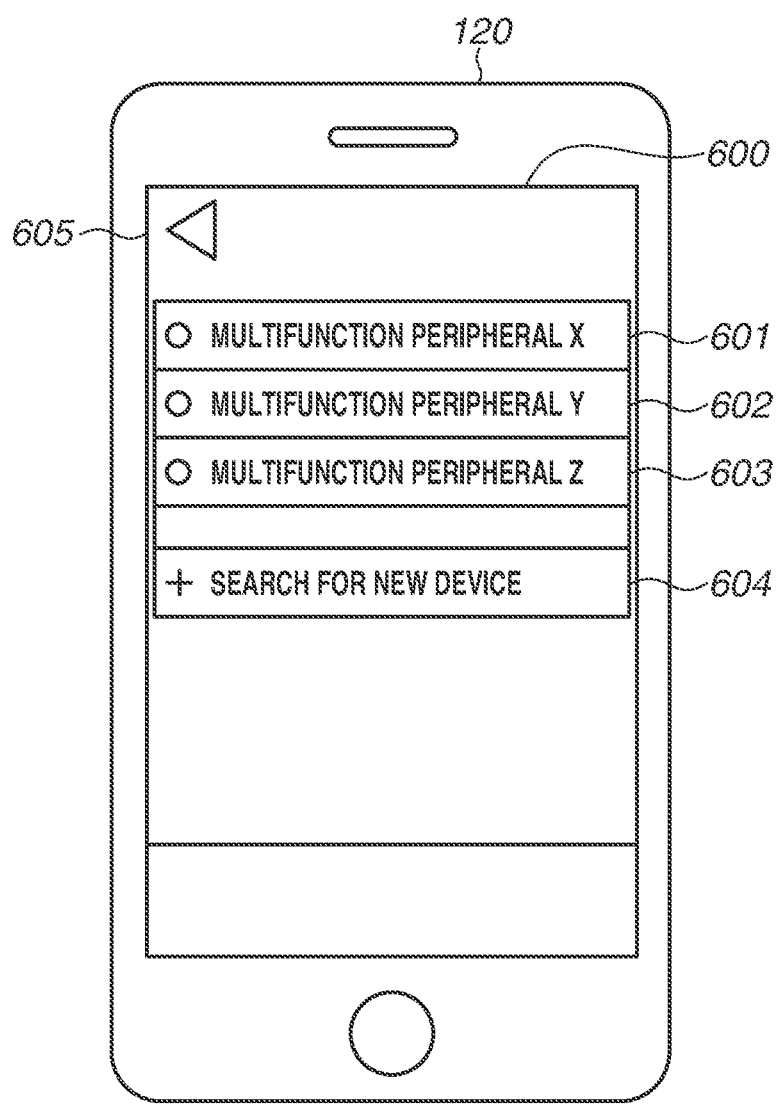
FIG. 6 is a diagram illustrating an example of a device selection screen.

FIG. 6 is a diagram illustrating a device selection screen 600. If transitioning to the device selection screen 600, the terminal apparatus 120 searches a network to which the terminal apparatus 120 is connected for MFPs 110 connected to the network. Then, the terminal apparatus 120 displays a list of discovered MFPs 110. If each of selection buttons 601, 602, and 603 for the MFPs 110 is pressed, the terminal apparatus 120 records, in the ROM 308, information such as the Internet Protocol (IP) address and the media access control (MAC) address of the MFP 110 corresponding to the pressed selection button 601, 602, or 603. The recorded MFP 110 is displayed in a selectable manner in the MFP list 405 on the menu screen 400.

If a "search for new device" button 604 is pressed, the terminal apparatus 120 searches the network to which the terminal apparatus 120 is connected for MFPs 110 again. Then, the terminal apparatus 120 updates the MFP list (the selection buttons) to be displayed on the device selection screen 600. Alternatively, as another example, the terminal apparatus 120 can receive an IP address directly input by the user and search for an MFP 110 based on the received IP address. If a return button 605 is pressed, the terminal apparatus 120 causes the screen display to transition to the menu screen 400 (FIG. 4).

Figure 7:
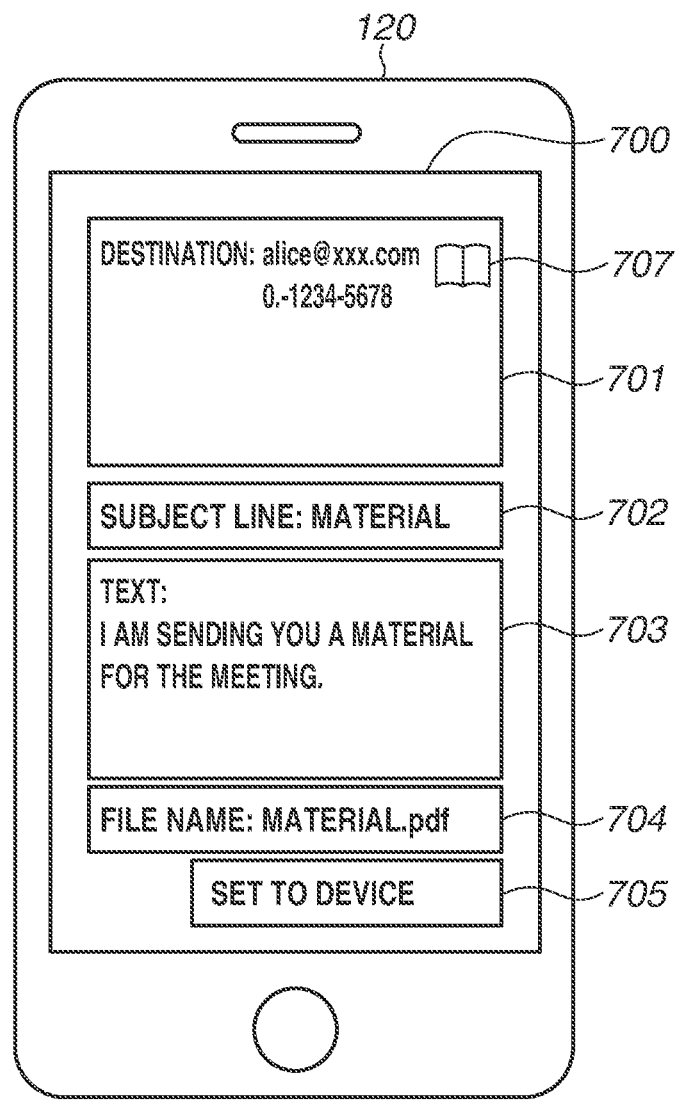
FIG. 7 is a diagram illustrating an example of a destination transmission screen.

FIG. 7 is a diagram illustrating a destination transmission screen 700. On the destination transmission screen 700, the user inputs information necessary to transmit a destination. An address book button 707 is a button for opening an address book app. If the user opens the address book app by pressing the address book button 707 and selects an email destination or a fax destination registered in the address book app, the selected email destination or fax destination is reflected in a destination entry field 701. A plurality of destinations can be simultaneously specified. A new destination can also be input to and specified in the destination entry field 701 using a software keyboard of the terminal apparatus 120.

A "subject line" field 702 is a field to which the subject line of an email is input. A "text" field 703 is a field to which the text of the email is input. A "file name" field 704 is a field to which the name of a file attached to the email is input. The user can input character strings using the software keyboard of the terminal apparatus 120 to the "subject line" field 702, the "text" field 703, and the "file name" field 704. Input can be provided to each field using the software keyboard as well speech recognition. While not illustrated in the present exemplary embodiment, in addition to these settings, settings when an MFP 110 scans a document, such as the resolution and the color mode, can also beset from the terminal apparatus 120.

If a "set to device" button 705 is pressed, the terminal apparatus 120 performs the process of transmitting data, such as the destination input on the destination transmission screen 700, to an MFP 110. At this time, if, as a method of connecting to an MFP 110 when a destination is transmitted, a setting is made such that a process for connecting to an MFP 110 to which the terminal apparatus 120 is already connected is not performed again, the terminal apparatus 120 immediately starts transmitting the data such as the destination to a currently selected MFP 110.

If a setting is made such that a process for connecting to an MFP 110 is performed when a destination is transmitted, and if Bluetooth® Low Energy radio waves are received, the terminal apparatus 120 acquires information necessary to make a Wi-Fi® connection to an MFP 110 using Bluetooth® Low Energy communication. In the case of a direct wireless connection in which the MFP 110 and the terminal apparatus 120 wirelessly communicate with each other, i.e., not via an external access point, the necessary information is a Service Set Identifier (SSID) and a key. In the case of an infrastructure connection in which the MFP 110 and the terminal apparatus 120 wirelessly communicate with each other via an external access point, the necessary information is an IP address. Then, the terminal apparatus 120 performs a Wi-Fi® handover and is paired with the MFP 110. The terminal apparatus 120 transmits the data, such as the destination, to the MFP 110 with which the terminal apparatus 120 is paired. In the present exemplary embodiment, as an example of the wireless communication method, a wireless communication method compliant with the Wi-Fi® standard is illustrated. The present disclosure, however, is not limited to this. Alternatively, a wireless communication method compliant with the Institute of Electrical and Electronics Engineers (IEEE) 802.11 series or another wireless communication method can be employed. The destination can also be transmitted using Bluetooth® Low Energy communication without performing a handover.

If Bluetooth® Low Energy radio waves are not received, the terminal apparatus 120 starts the camera 304 to read a QR Code® displayed on an MFP 110. The terminal apparatus 120 reads the QR Code®, acquires information necessary for a Wi-Fi® connection from the read QR Code®, performs a Wi-Fi® handover, and is paired with the MFP 110. Then, the terminal apparatus 120 transmits the data, such as the destination, to the MFP 110 with which the terminal apparatus 120 is paired. If the transmission of the data to the MFP 110 is completed, the terminal apparatus 120 clears all the inputs on the destination transmission screen 700. Then, the terminal apparatus 120 causes the screen display to transition back to the menu screen 400 (FIG. 4). If the transmission of the data fails, the terminal apparatus 120 displays an error indication and maintains the inputs on the destination transmission screen 700 without clearing the inputs.

Figure 8A:
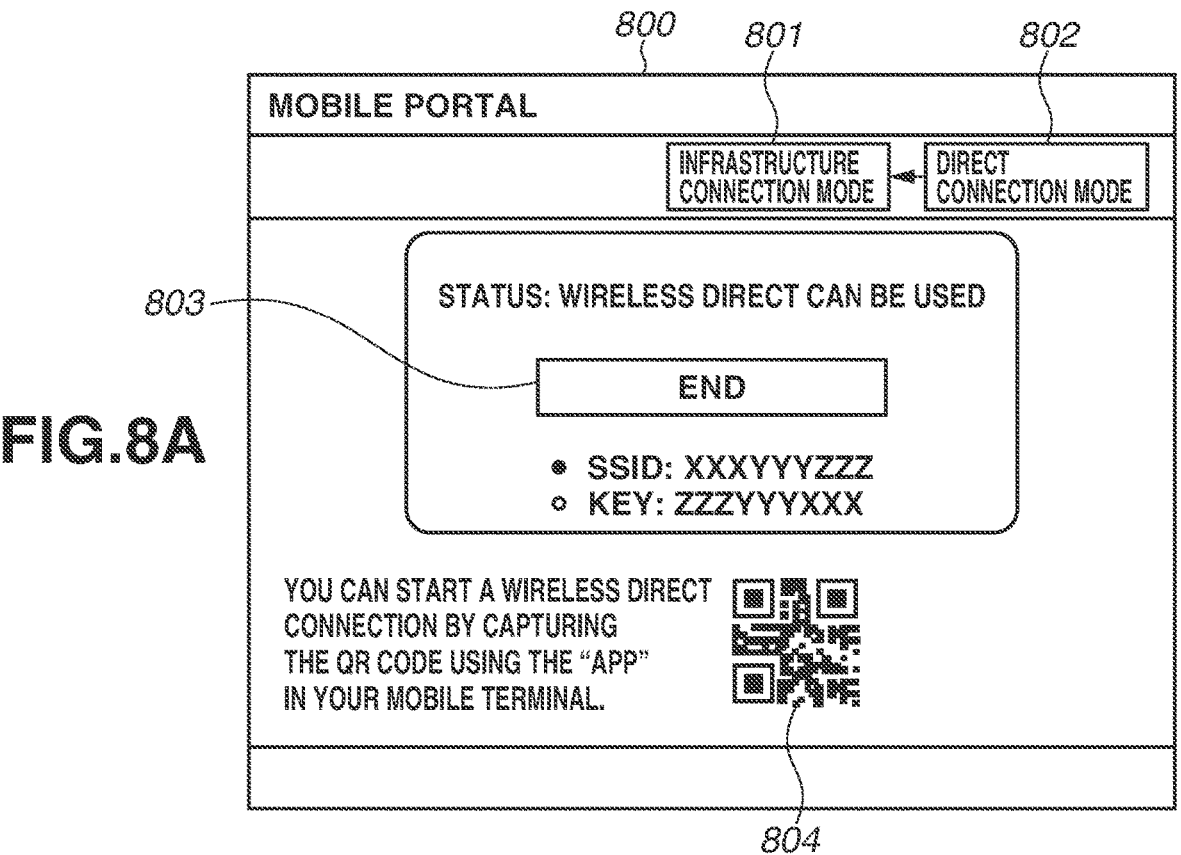
FIGS. 8A and 8B are diagrams illustrating examples of a portal screen.
Figure 8B:
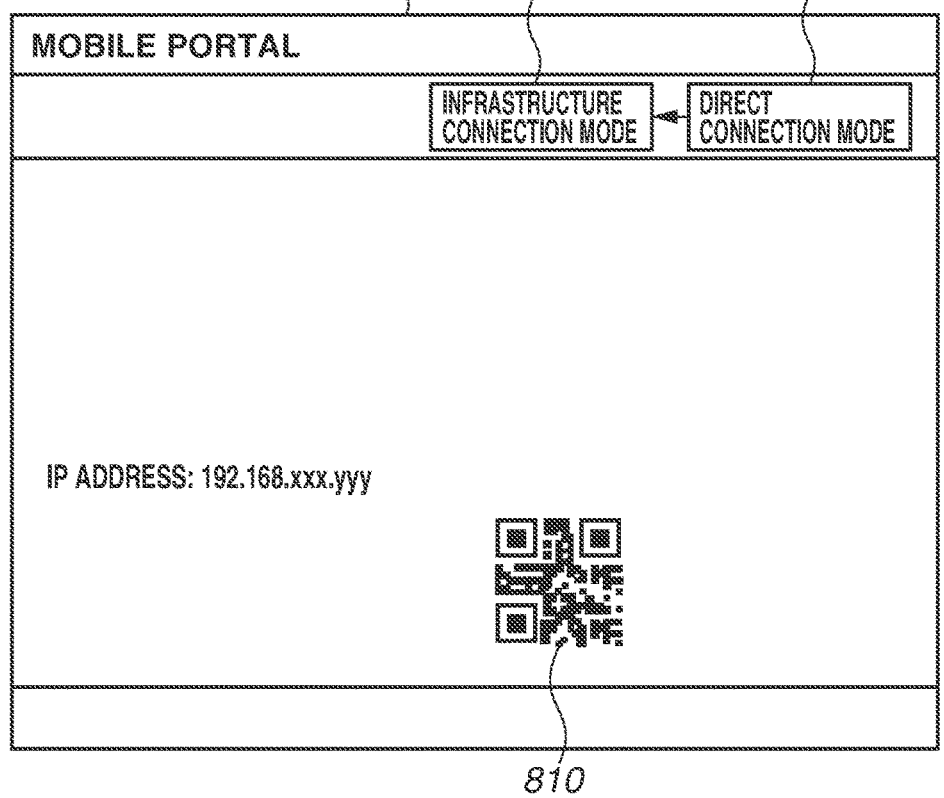

Next, display screens of the MFP 110 are described with reference to FIGS. 8A, 8B, 9, 10 and 11. FIGS. 8A and 8B are diagrams illustrating a portal screen 800. The portal screen 800 is displayed when the MFP 110 and the terminal apparatus 120 make a Wi-Fi® connection to each other. The portal screen 800 includes an "infrastructure connection mode" button 801 and a "direct connection mode" button 802, which enable the switching of the display of information for connecting to the terminal apparatus 120 in a Wi-Fi® infrastructure mode and a Wi-Fi Direct® mode, respectively.

FIG. 8A illustrates an example of display in a case where the "direct connection mode" button 802 is pressed. If a Wi-Fi Direct® communication operation button 803 is pressed, the MFP 110 starts or stops Wi-Fi Direct® communication. FIG. 8A illustrates the state where Wi-Fi Direct® communication is started. When Wi-Fi Direct® communication is started, the MFP 110 displays information necessary for the Wi-Fi Direct® communication on the screen and also displays a QR Code® 804, in which the information is embedded. The information necessary for the Wi-Fi Direct® communication is, for example, an SSID and a key. The present disclosure, however, is not limited to these. If the Wi-Fi Direct® communication is stopped, the MFP 110 hides the information and the QR Code® 804.

FIG. 8B illustrates an example of display in a case where the "infrastructure connection mode" button 801 is pressed. In this case, the MFP 110 displays information for the terminal apparatus 120 and the MFP 110 to make a Wi-Fi® infrastructure connection to each other via the access point 130, and also displays a QR Code® 810, in which the information is embedded. The information necessary for the Wi-Fi® infrastructure connection is, for example, the IP address of the MFP 110. The present disclosure, however, is not limited to this.

In the case of the Wi-Fi Direct® connection, the terminal apparatus 120 can read the QR Code® 804, thereby automatically acquiring the SSID and the key. Then, the terminal apparatus 120 can perform a handover to a Wi-Fi Direct® network and become able to communicate with the MFP 110. In the case of the Wi-Fi® infrastructure connection, the terminal apparatus 120 can read the QR Code® 810, thereby automatically acquiring the IP address of the MFP 110. Then, the terminal apparatus 120 can be paired with the MFP 110 and determine a connection destination.

In the state where the NFC reader/writer 204 can be used in the MFP 110, the terminal apparatus 120 can acquire, using an NFC communication function, information that is the same as the above information that can be acquired from each QR Code® and make a Wi-Fi® connection. Similarly, in the state where the Bluetooth® I/F 205 can be used in the MFP 110, the terminal apparatus 120 can acquire the same information using a Bluetooth® Low Energy communication function of the terminal apparatus 120 and make a Wi-Fi® connection.

Figure 9:
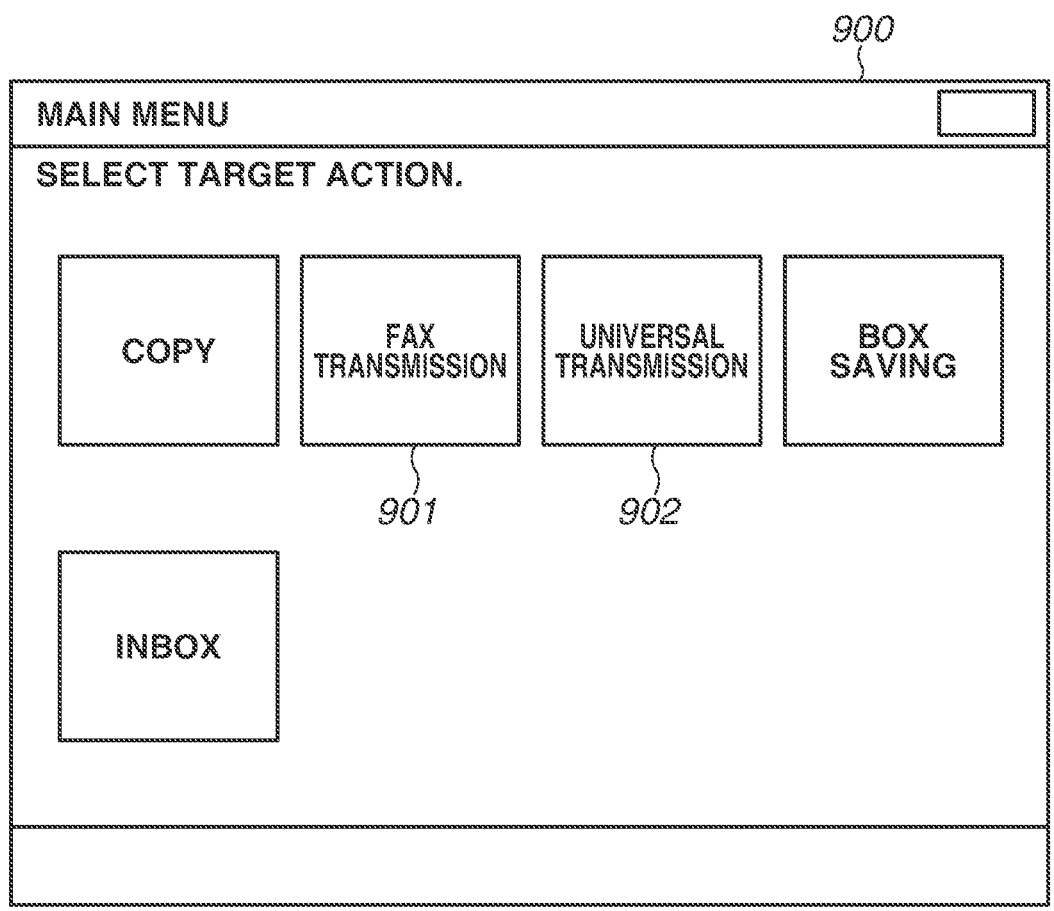
FIG. 9 is a diagram illustrating an example of a main menu screen.
Figure 10:
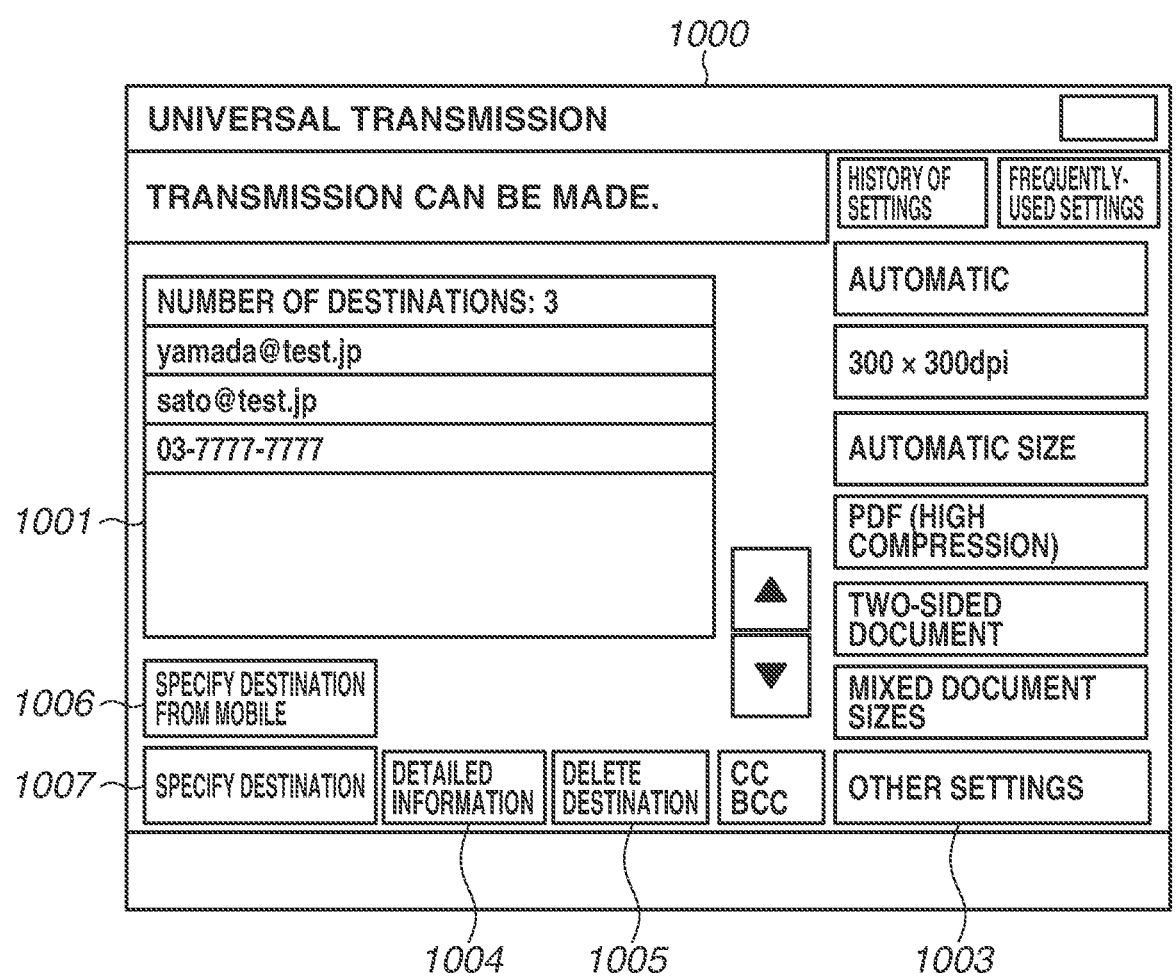
FIG. 10 is a diagram illustrating an example of a universal transmission screen.
Figure 11:
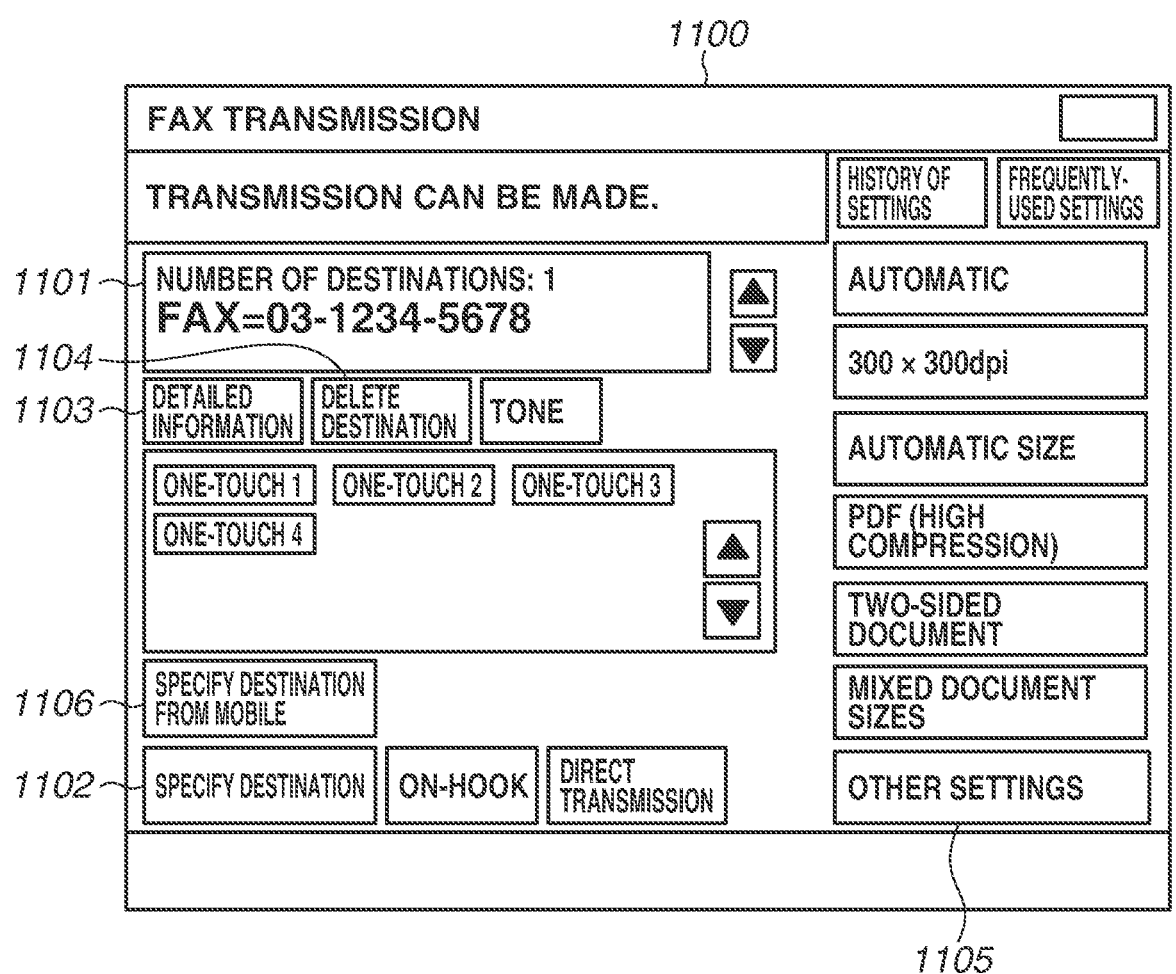
FIG. 11 is a diagram illustrating an example of a fax transmission screen.

FIG. 9 is a diagram illustrating a main menu screen 900. Buttons enabling the selection of functions available in the MFP 110 are arranged on the main menu screen 900. If a "fax transmission" button 901 is pressed, the MFP 110 displays a fax transmission screen (FIG. 11). If a "universal transmission" button 902 is pressed, the MFP 110 displays a universal transmission screen (FIG. 10). The "universal transmission" refers to a transmission process via a network (a network transmission process).

FIG. 10 is a diagram illustrating a universal transmission screen 1000. The universal transmission screen 1000 is displayed when a scanned document image is transmitted using a plurality of protocols such as email, fax, Server Message Block (SMB), and File Transfer Protocol (FTP) protocols. The universal transmission screen 1000 is an example of a screen compatible with a network transmission function regarding network transmission and a fax transmission function regarding fax transmission. In a destination list 1001, a list of destinations set as transmission destinations is displayed. On the universal transmission screen 1000, a plurality of protocols such as email, fax, SMB, and FTP protocols can be simultaneously specified for destinations. The user can select a start key (not illustrated) in the state where a transmission destination is set, thereby transmitting image data obtained by the scanner 215 reading an image on a document to the set transmission destination. If the start key (not illustrated) is selected in the state where a transmission destination is set, the CPU 201 cooperates with the scanner 215 to generate image data. The CPU 201 cooperates with the network I/F 207 or the wireless LAN I/F 206 to transmit the image data to the transmission destination. If the destination is a facsimile number, the CPU 201 cooperates with the modem 218 to transmit the image data.

FIG. 10 illustrates an example where destinations are set and displayed in the destination list 1001. In the state where no destination is set, no destination is displayed in the destination list 1001. A destination can be added to the destination list 1001 by pressing a "specify destination" button 1007 to cause the screen display to transition to an address book screen (FIG. 12) and selecting the destination from destinations registered in an address book of the MFP 110. A destination can also be added from the terminal apparatus 120.

If a "detailed information" button 1004 is pressed, the MFP 110 causes the screen display to transition to a screen on which detailed information of a currently selected destination is displayed. If a "delete destination" button 1005 is pressed, the MFP 110 can delete a currently selected destination. If an "other settings" button 1003 is pressed, the MFP 110 displays a screen of a menu list for changing the content of transmission. If a "specify destination from mobile" button 1006 is pressed, the MFP 110 causes the screen display to transition to the portal screen 800.

FIG. 11 is a diagram illustrating a fax transmission screen 1100. The fax transmission screen 1100 is dedicated to fax and has a screen configuration facilitating an operation for performing fax transmission. The fax transmission screen 1100 is an example of a screen compatible with the fax function. The fax transmission screen 1100 is not compatible with the network transmission function. The fax transmission screen 1100 is specialized in fax transmission through the fax transmission screen 1100. For example, using a direct transmission button, the user can use a direct transmission function of dialing the number of a set destination before a document is scanned, and after it is confirmed that fax can be transmitted to the set destination, starting to read and transmit the document.

The user can select a start key (not illustrated) in the state where a transmission destination is set as in FIG. 11, thereby transmitting image data obtained by the scanner 215 reading an image on a document to the set transmission destination. If the start key (not illustrated) is selected in the state where a transmission destination is set, the CPU 201 cooperates with the scanner 215 to generate image data. The CPU 201 cooperates with the modem 218 to transmit the image data to the set transmission destination.

A list of destinations set as transmission destinations is displayed in a fax destination list 1101. In the fax destination list 1101, only a fax destination can be set. FIG. 11 illustrates an example where a destination is set and displayed in the fax destination list 1101. In the state where no destination is set, no destination is displayed in the fax destination list 1101. A destination can be added to the fax destination list 1101 by pressing a "specify destination" button 1102 to cause the screen display to transition to the address book screen (FIG. 12) and selecting the destination from destinations registered in the address book of the MFP 110. A fax destination can also be added from the terminal apparatus 120.

If a "detailed information" button 1103 is pressed, the MFP 110 causes the screen display to transition to a screen on which detailed information of a currently selected destination is displayed. If a "delete destination" button 1104 is pressed, the MFP 110 deletes a currently selected destination. If an "other settings" button 1105 is pressed, the MFP 110 displays a screen of a menu list for changing the content of transmission. If a "specify destination from mobile" button 1106 is pressed, the MFP 110 causes the screen display to transition to the portal screen 800 (FIGS. 8A and 8B).

Figure 12:
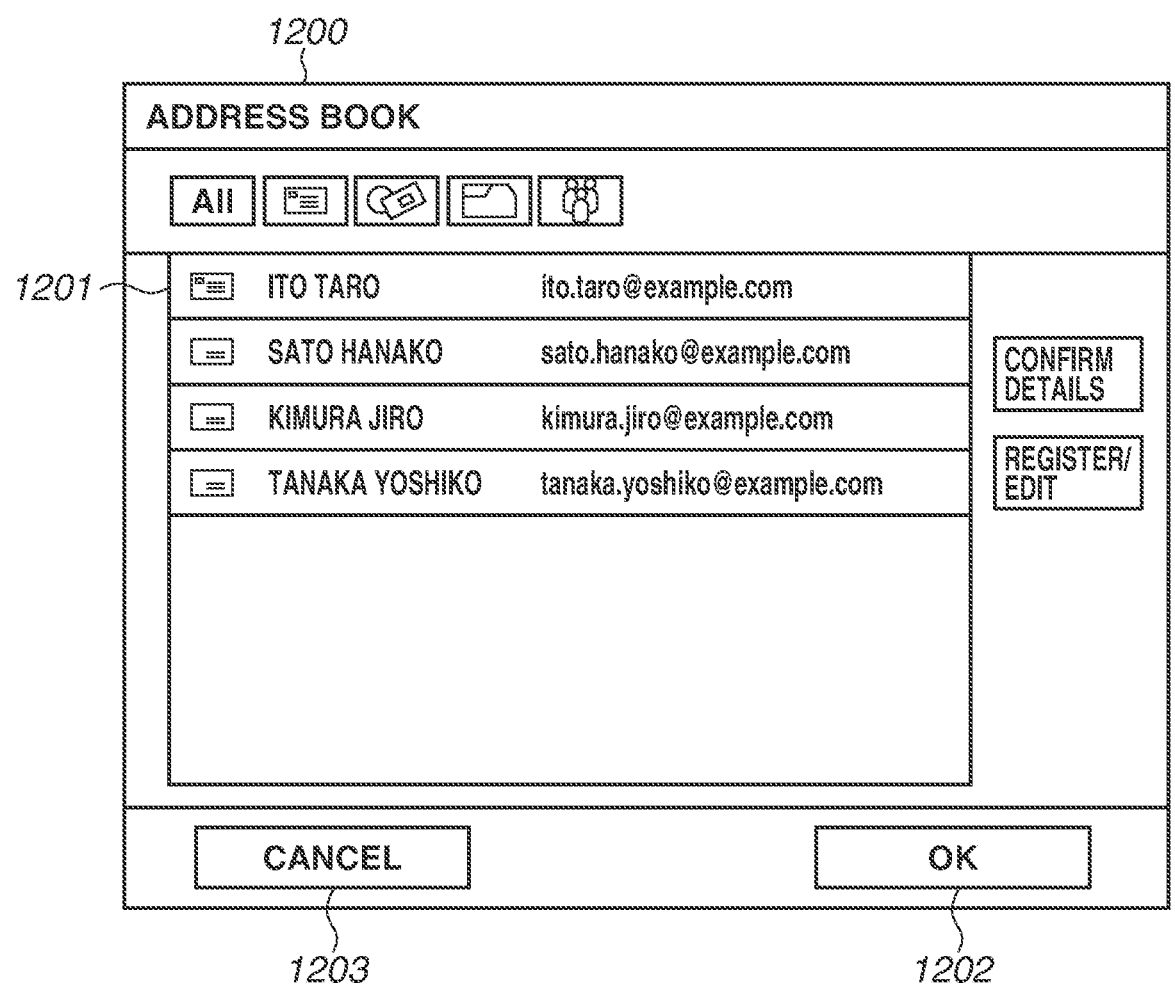
FIG. 12 is a diagram illustrating an example of an address book screen.

FIG. 12 is a diagram illustrating an address book screen 1200. In the address book screen 1200, a destination display field 1201 is provided in which destinations registered in the address book of the MFP 110 are displayed. The user can select one or more destinations from the displayed destinations. If an "OK" button 1202 is pressed, the MFP 110 closes the address book screen 1200 and sets, in a destination list on a screen of a calling source, the destinations selected in the destination display field 1201. If a "cancel" button 1203 is pressed, the MFP 110 closes the address book screen 1200. In this case, the MFP 110 does not update the destination list 1001 or the fax destination list 1101.

Next, data to be transmitted from the terminal apparatus 120 to the MFP 110 will be described. The transmission data includes a data type, a destination type, an email type, data, a destination corresponding to the destination type, the number of emails, text, and an attached file. Examples of the data type include "destination", "subject line", "text", and "file name". The destination type is an attribute for, in a case where the data type is "destination", distinguishing whether the destination is email or fax. In the data, a value based on the data type is stored.

Figure 13:
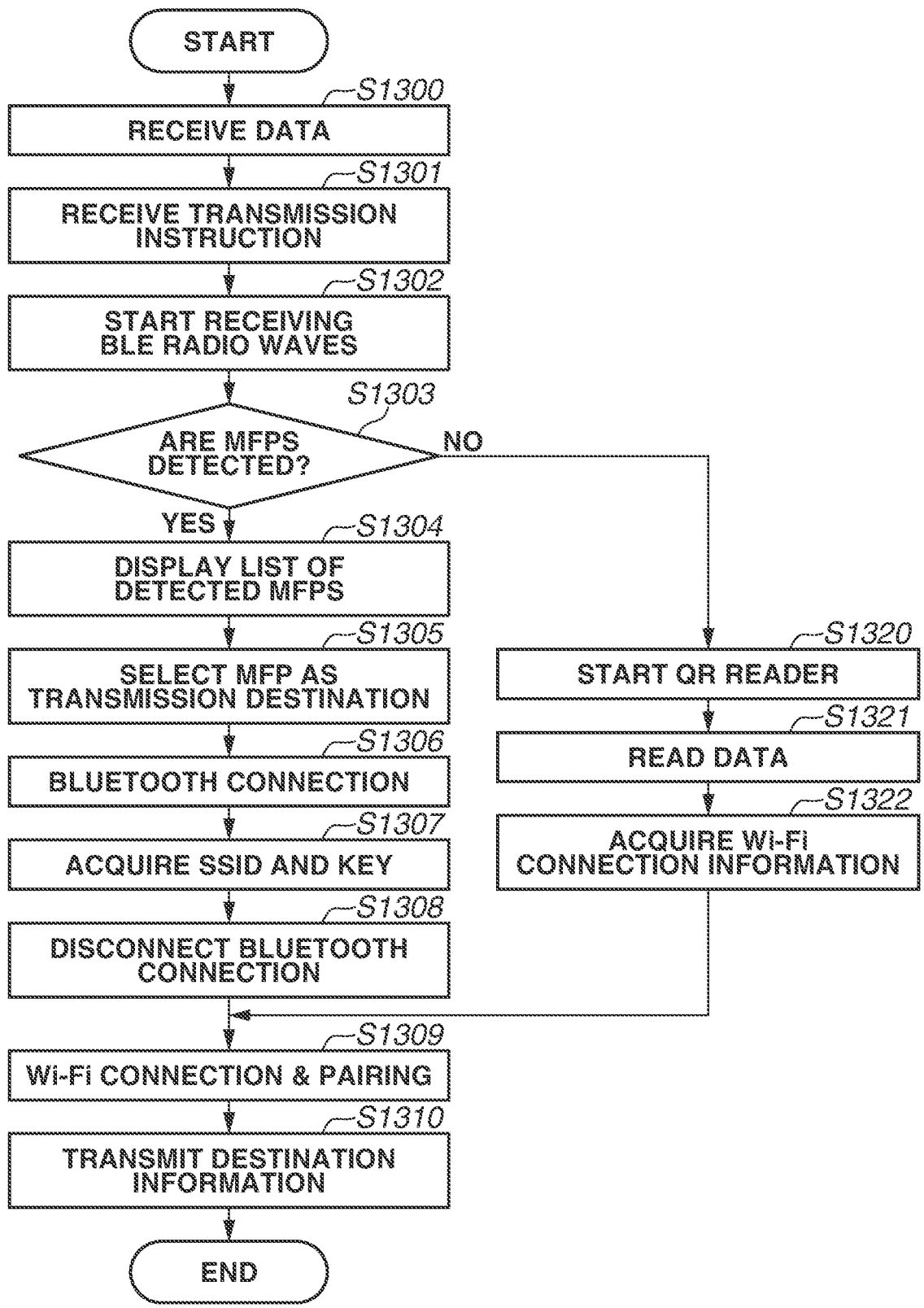
FIG. 13 is an example of a flowchart illustrating a destination information transmission process.

FIG. 13 is a flowchart illustrating a destination information transmission process performed by the terminal apparatus 120. In step S1300, based on a user operation on the operation panel 301, the CPU 307 of the terminal apparatus 120 receives destination information and records the destination information in the RAM 309. At this time, the destination information includes a destination type, an email type, and a destination corresponding to the destination type. Next, in step S1301, based on a user operation on the operation panel 301, the CPU 307 receives an instruction to perform transmission to an MFP 110. Then, in step S1302, the CPU 307 instructs the Bluetooth® I/F 306 to start receiving Bluetooth® Low Energy radio waves. In response to this, the Bluetooth® I/F 306 starts receiving Bluetooth® Low Energy radio waves. Then, the CPU 307 analyzes an advertising packet received by the Bluetooth® I/F 306.

Next, in step S1303, the CPU 307 determines, based on whether the received advertising packet includes information indicating an MFP 110 compatible with a destination transmission function, whether MFPs 110 are detected. If MFPs 110 are detected (Yes in step S1303), the processing proceeds to step S1304. If MFPs 110 are not detected (No in step S1303), the processing proceeds to step S1320.

In step S1304, the CPU 307 displays a list of all the detected MFPs 110 on the operation panel 301. Next, in step S1305, if receiving an instruction to select an MFP 110 based on a user operation, the CPU 307 selects one of the MFPs 110 as a communication partner based on the selection instruction. Next, in step S1306, the CPU 307 instructs the Bluetooth® I/F 306 to start Generic Attribute Profile (GATT) communication using Bluetooth® Low Energy. In response to this, the Bluetooth® I/F 306 starts GATT communication using Bluetooth® Low Energy. Next, in step S1307, the Bluetooth® I/F 306 acquires the values of an SSID and a key made public by the MFP 110.

Next, in step S1308, the CPU 307 instructs the Bluetooth® I/F 306 to disconnect the Bluetooth® Low Energy communication. In response to this, the Bluetooth® I/F 306 disconnects the Bluetooth® Low Energy communication. Next, in step S1309, the CPU 307 starts connecting to the MFP 110 through Wi-Fi Direct® communication using the wireless LAN I/F 311 and is paired with an acquired IP address. If the pairing is completed, the processing proceeds to step S1310. In step S1310, the CPU 307 transmits the destination information stored in the RAM 309 and including the destination and the subject line, to the MFP 110, using the wireless LAN I/F 311. Thus, the destination information transmission process ends.

In step S1320, the CPU 307 starts a QR reader. Next, in step S1321, using the camera 304, the CPU 307 captures a QR Code® displayed on the portal screen 800 of an MFP 110. Next, in step S1321, the CPU 307 acquires the captured image and decodes the content of the captured image. Then, in step S1322, the CPU 307 acquires Wi-Fi® connection information included in the decoded data, and the processing proceeds to step S1309.

Figure 14:
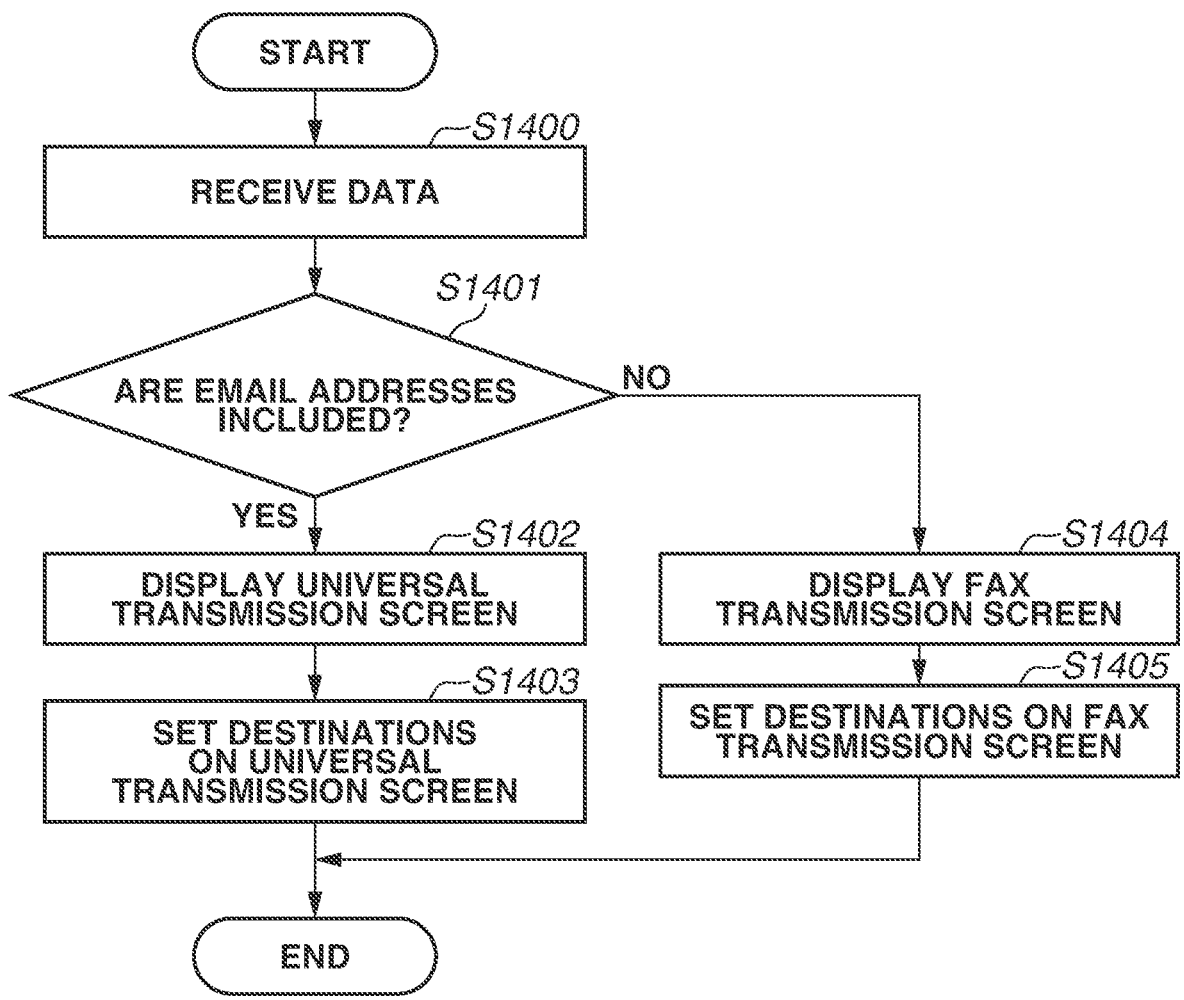
FIG. 14 is an example of a flowchart illustrating a destination information reception process.

FIG. 14 is a flowchart illustrating a destination information reception process performed by the MFP 110. In step S1400, the CPU 201 of the MFP 110 receives destination information from the terminal apparatus 120 via the network I/F 207. Next, in step S1401, the CPU 201 confirms whether the received destination information includes one or more email addresses. Specifically, the CPU 201 confirms whether one or more destinations of which the destination types are set to email are included. If one or more email addresses are included (Yes in step S1401), the processing proceeds to step S1402. If no email address is included, i.e., only fax numbers are included (No in step S1401), the processing proceeds to step S1404.

In step S1402, the CPU 201 performs control to display the universal transmission screen 1000 on the display 211. Next, in step S1403, the CPU 201 sets the email addresses as destinations in the destination list 1001 on the universal transmission screen 1000. The destination reception process then ends. In step S1404, the CPU 201 performs control to display the fax transmission screen 1100 on the display 211. Next, in step S1405, the CPU 201 sets the fax numbers as destinations in the fax destination list 1101 on the fax transmission screen 1100. The destination reception process then ends. The user can select the start key (not illustrated) and provide an instruction to perform transmission to the destinations set by the above processing. If the CPU 201 detects that the start key (not illustrated) is selected in the state where the transmission destinations are set, the CPU 201 cooperates with the scanner 215 to generate image data. The CPU 201 cooperates with the network I/F 207 or the wireless LAN I/F 206 to transmit the image data to the transmission destinations. In a case where the destinations are facsimile numbers, the CPU 201 cooperates with the modem 218 to transmit the image data.

The processes of steps S1402 and S1404 are examples of a display process for performing control such that in a case where the destination is a fax number, the screen compatible with the fax function is displayed, and in a case where the destination includes an email address, the screen compatible with the network transmission function and the fax function is displayed. The processes of steps S1403 and S1405 are examples of a process for, in a case where the destination includes an email address, setting the destination in association with a universal transmission screen, and in a case where the destination does not include an email address and includes a fax number, setting the destination in association with a fax transmission screen.

As described above, in the image forming system according to the first exemplary embodiment, a destination transmitted from the terminal apparatus 120 is set on an optimal function screen of the MFP 110 based on the protocol type of the destination. Even if a plurality of destinations are simultaneously transmitted from the terminal apparatus 120, and a plurality of protocol types are mixed together, these destinations are set on an optimal function screen of the MFP 110 based on these protocol types. As described above, the MFP 110 can provide a mechanism for improving user operability in a case where the setting of a destination is received from the terminal apparatus 120. The MFP 110 can provide a mechanism that, after the destination is set, adds a further destination and changing transmission settings and scan settings from the function screen. Thus, the user can additionally make an optional setting that cannot be made from a mobile application, but can be made through the operation panel of the MFP 110. For example, in a case where the destination does not include an email address and includes a fax number, a screen specialized in fax transmission is displayed. Thus, the user can easily use an optional setting and an optional function specialized in fax transmission, such as a direct transmission function.

As a variation of the first exemplary embodiment, if the destination type is set to email in step S1401, the MFP 110 can perform only either one of the processes of steps S1402 and S1403. If the destination type is set to fax in step S1401, the MFP 110 can perform only either one of the processes of steps S1404 and S1405.

Next, an image forming system according to a second exemplary embodiment is described. In the image forming system according to the second exemplary embodiment, based on information set in advance for a function screen, the MFP 110 controls whether to display or hide the function screen. The differences between the image forming system according to the second exemplary embodiment and the image forming system according to the first exemplary embodiment are described below.

FIG. 15 is a diagram illustrating an example of display setting information. In display setting information 1500, a setting can be changed, for example, based on a user operation. The display setting information 1500 is stored in the ROM 202 or the HDD 213 of the MFP 110. A setting 1501 indicates the presence or absence of a license to use the universal transmission function. If the license is installed, the setting 1501 is set to "present". If the license is not installed, the setting 1501 is set to "absent". Similarly, a setting 1502 indicates the presence or absence of a fax license. A setting 1503 indicates whether to display the "universal transmission" button 902 on the main menu screen 900.

A setting 1504 indicates whether to display the fax function on the universal transmission screen 1000. A setting 1505 indicates whether to display the "fax transmission" button 901 on the main menu screen 900. Fax transmission can be performed through the fax transmission screen 1100, which is convenient. Then, to prohibit fax on the universal transmission screen 1000, settings can be made as illustrated in FIG. 15. In addition to the above settings, based on a function license or a hardware configuration, the MFP 110 can control whether to display or hide the screens for the fax function and the universal transmission function. The display setting information 1500 indicates a setting regarding whether to permit or prohibit the display of a screen (the presence or absence of a license).

Figure 16:
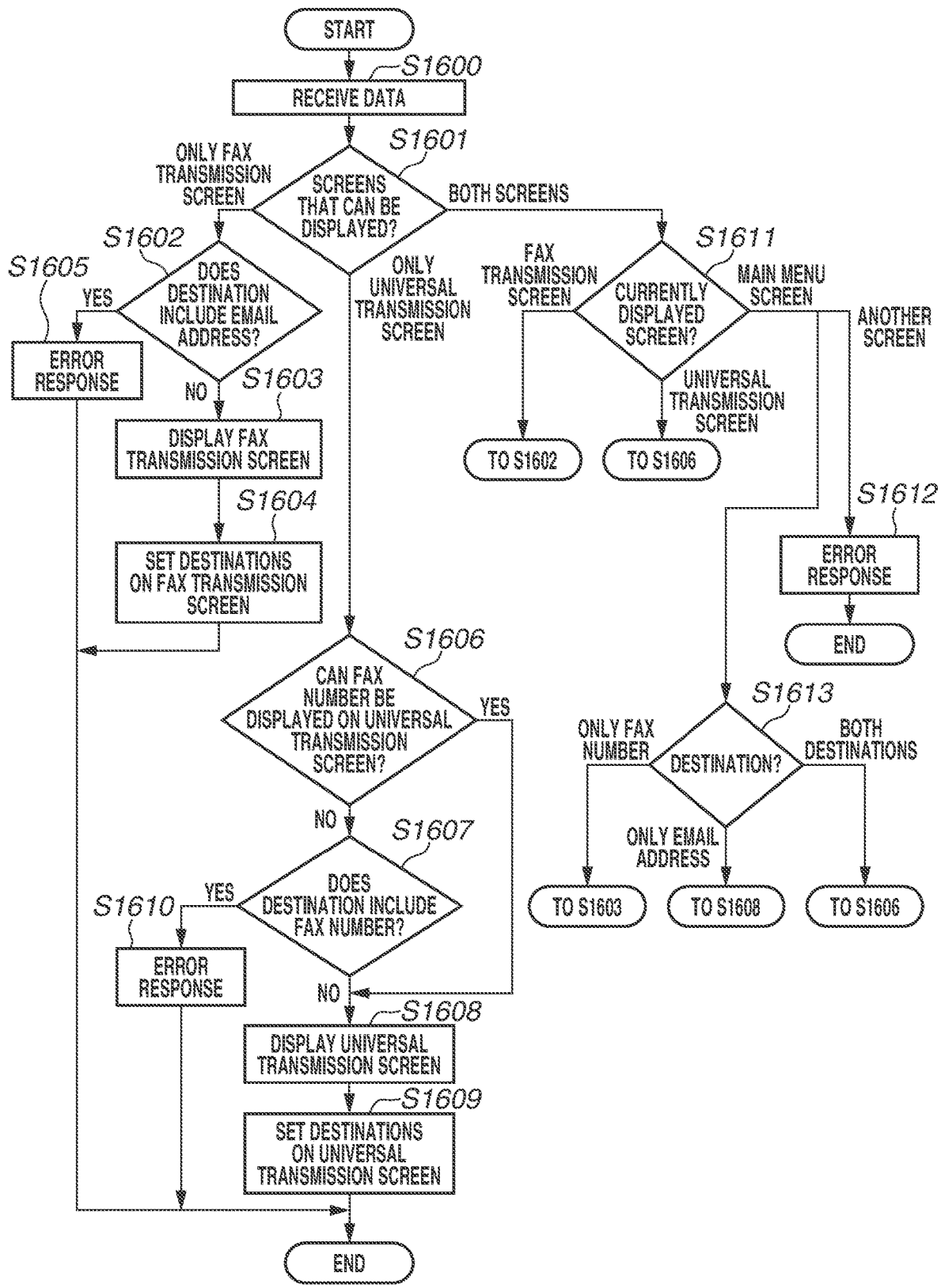
FIG. 16 is an example of a flowchart illustrating a destination information reception process according to a second exemplary embodiment.

FIG. 16 is a flowchart illustrating a destination information reception process performed by the MFP 110 according to the second exemplary embodiment. In step S1600, the CPU 201 of the MFP 110 receives destination information from the terminal apparatus 120 via the network I/F 207. This process is similar to the process of step S1400. Next, in step S1601, the CPU 201 references the display setting information 1500 and confirms screens that can be displayed. If the screens that can be displayed are only the fax transmission screen 1100 ("only fax transmission screen" in step S1601), the processing proceeds to step S1602. If the screens that can be displayed are only the universal transmission screen 1000 ("only universal transmission screen" in step S1601), the processing proceeds to step S1606. If the screens that can be displayed are both the universal transmission screen 1000 and the fax transmission screen 1100 ("both screens" in step S1601), the processing proceeds to step S1611.

At this time, regarding the universal transmission screen 1000, if the value of the universal transmission license 1501 in the display setting information 1500 is "present", the CPU 201 determines that the universal transmission screen 1000 can be displayed. Regarding the fax transmission screen 1100, if the value of the fax license 1502 is "present", and the modem I/F 217 detects the modem 218, the CPU 201 determines that the fax transmission screen 1100 can be displayed.

In step S1602, the CPU 201 determines whether the destination information includes an email address. If the destination information includes an email address (Yes in step S1602), the processing proceeds to step S1605. If the destination information does not include an email address (No in step S1602), the processing proceeds to step S1603. In step S1603, the CPU 201 performs control to display the fax transmission screen 1100. Next, in step S1604, the CPU 201 sets all fax numbers included in the destination information as destinations in the fax destination list 1101 on the fax transmission screen 1100. The CPU 201 also transmits a success response to the terminal apparatus 120. The destination information reception process then ends. In step S1605, the CPU 201 transmits an error response to the terminal apparatus 120. That is, in this case, the CPU 201 does not display a function screen or set a destination.

In step S1606, based on the value of the "display of fax on universal transmission screen" 1504 in the display setting information 1500, the CPU 201 determines whether a fax number can be displayed on the universal transmission screen 1000. If a fax number can be displayed (Yes in step S1606), the processing proceeds to step S1608. If a fax number cannot be displayed (No in step S1606), the processing proceeds to step S1607.

In step S1607, the CPU 201 determines whether the destination information includes a fax number. If the destination information includes a fax number (Yes in step S1607), the processing proceeds to step S1610. If the destination information does not include a fax number (No in step S1607), the processing proceeds to step S1608. In step S1608, the CPU 201 performs control to display the universal transmission screen 1000. Next, in step S1609, the CPU 201 sets all destinations included in the destination information as destinations in the destination list 1001 on the universal transmission screen 1000. In step S1610, the CPU 201 transmits an error response to the terminal apparatus 120.

In step S1611, the CPU 201 identifies a screen displayed on the display 211 at the time of the processing, i.e., the timing when the destination information is received. If the currently displayed screen is the fax transmission screen 1100 ("fax transmission screen" in step S1611), the processing proceeds to step S1602. If the currently displayed screen is the universal transmission screen 1000 ("universal transmission screen" in step S1611), the processing proceeds to step S1606. If the currently displayed screen is a screen other than the transmission function screens ("another screen" in step S1611), the processing proceeds to step S1612. In step S1612, the CPU 201 transmits an error response to the terminal apparatus 120. If the currently displayed screen is the main menu screen 900 ("main menu screen" in step S1611), the processing proceeds to step S1613.

In step S1613, the CPU 201 determines the types of the destinations. If the destinations are only a fax number ("only fax number" in step S1613), the processing proceeds to step S1603. If the destinations are only an email address ("only email address" in step S1613), the processing proceeds to step S1608. If the destinations include both a fax number and an email address ("both destinations" in step S1613), the processing proceeds to step S1606. As described above, if a setting is made such that both the universal transmission screen 1000 and the fax transmission screen 1100 are permitted to be displayed, then based on the currently displayed display screen, the MFP 110 controls the universal transmission screen 1000 and the fax transmission screen 1100 to be displayed or hidden. The rest of the configuration and the processing of the image forming system according to the second exemplary embodiment are similar to the configuration and the processing of the image forming system according to the first exemplary embodiment.

As described above, in the second exemplary embodiment, the MFP 110 can display an appropriate screen based on display setting information. The MFP 110 can set a destination on an appropriate screen. This enables the user to perform a transmission operation on a screen that is easier to use.

As a variation of the second exemplary embodiment, based on at least one of the permission or prohibition of display and the type of the currently displayed screen, the MFP 110 can determine a screen to be displayed, and a screen on which a destination is set.

As described above, according to the present disclosure, a mechanism for improving user operability in a case where the setting of a destination is received from a terminal apparatus can be provided.

While exemplary embodiments have been described in detail, these exemplary embodiments are not seen to be limiting, and can be modified and changed in various manners within the scope of the appended claims.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus which is able to communicate with a mobile terminal, the image processing apparatus comprising:

a scanner that scans a document sheet; and a processor that performs a first function and a second function, wherein, in the first function, an email address selected by a user on the mobile terminal from among email addresses stored in the mobile terminal is received from the mobile terminal, and the received email address is displayed as a destination, and transmission of image data generated by the scanner based on the received email address is performed based on an instruction received from the user, and wherein, in the second function, a facsimile number selected by a user on the mobile terminal from among facsimile numbers stored in the mobile terminal is received from the mobile terminal, and the received facsimile number is displayed as a destination, and transmission of image data generated by the scanner based on the received facsimile number is performed based on an instruction received from the user.

2. The image processing apparatus according to claim 1, wherein, in the first function, the email address selected by the user on the mobile terminal from among the email addresses stored in the mobile terminal is received from the mobile terminal, and a first screen including the received email address is displayed and transmission of image data generated by the scanner based on the received email address is performed based on the instruction received from the user, and wherein, in the second function, the facsimile number selected by a user on the mobile terminal from among the facsimile numbers stored in the mobile terminal is received from the mobile terminal, and a second screen including the received facsimile number is displayed and transmission of image data generated by the scanner based on the received facsimile number is performed based on the instruction received from the user.

3. The image processing apparatus according to claim 2, wherein a type of the first screen is different from a type of the second screen.

4. The image processing apparatus according to claim 2, wherein the first screen is able to receive a transmitting setting and the second screen is able to receive another transmitting setting which is not able to be received by the first screen.

5. The image processing apparatus according to claim 2, wherein the first screen is able to receive a transmitting setting and the second screen is able to receive another transmitting setting which is not able to be received by the first screen.

6. The image processing apparatus according to claim 2, wherein the first screen is able to receive a transmitting setting from the user after the first screen including the email address is displayed.

7. The image processing apparatus according to claim 2, wherein the second screen is able to receive a transmitting setting from the user after the second screen including the facsimile number is displayed.

8. The image processing apparatus according to claim 1, wherein the email address is received by Wi-Fi communication.

9. The image processing apparatus according to claim 8, wherein the image processing apparatus transmits an SSID by which the mobile terminal performs the Wi-Fi communication.

10. The image processing apparatus according to claim 1, wherein the facsimile number is received by Wi-Fi communication.

11. The image processing apparatus according to claim 10, wherein the image processing apparatus transmits an SSID by which the mobile terminal performs the Wi-Fi communication.

12. A control method for controlling an image processing apparatus which is able to communicate with a mobile terminal, the control method comprising:
 scanning a document sheet; and
 performing a first function and a second function,
 wherein, in the first function, an email address selected by a user on the mobile terminal from among email addresses stored in the mobile terminal is received from the mobile terminal, and display of the received email address is displayed as a destination, and transmission of generated image data based on the received email address is performed based on an instruction received from the user, and
 wherein, in the second function, a facsimile number selected by a user on the mobile terminal from among facsimile numbers stored in the mobile terminal is received from the mobile terminal, and the received facsimile number is displayed as a destination, and transmission of generated image data based on the received facsimile number is performed based on an instruction received from the user.

13. A non-transitory computer-readable medium for storing a computer program including instructions, which when executed by one or more processors of an image processing apparatus which is able to communicate with a mobile terminal, cause the image processing apparatus to:
 cause a scanner to scan a document sheet; and
 perform a first function and a second function,
 wherein, in the first function, an email address selected by a user on the mobile terminal from among email addresses stored in the mobile terminal is received from the mobile terminal, and the received email address is displayed as a destination, and transmission of image data generated by the scanner based on the received email address is performed based on an instruction received from the user, and
 wherein, in the second function, a facsimile number selected by a user on the mobile terminal from among facsimile numbers stored in the mobile terminal is received from the mobile terminal, and the received facsimile number is displayed as a destination, and transmission of image data generated by the scanner based on the received facsimile number is performed based on an instruction received from the user.

* * * * *